(No Model.)
A. BARKER.
BEAM CALIPERS.
No. 496,679. Patented May 2, 1893.
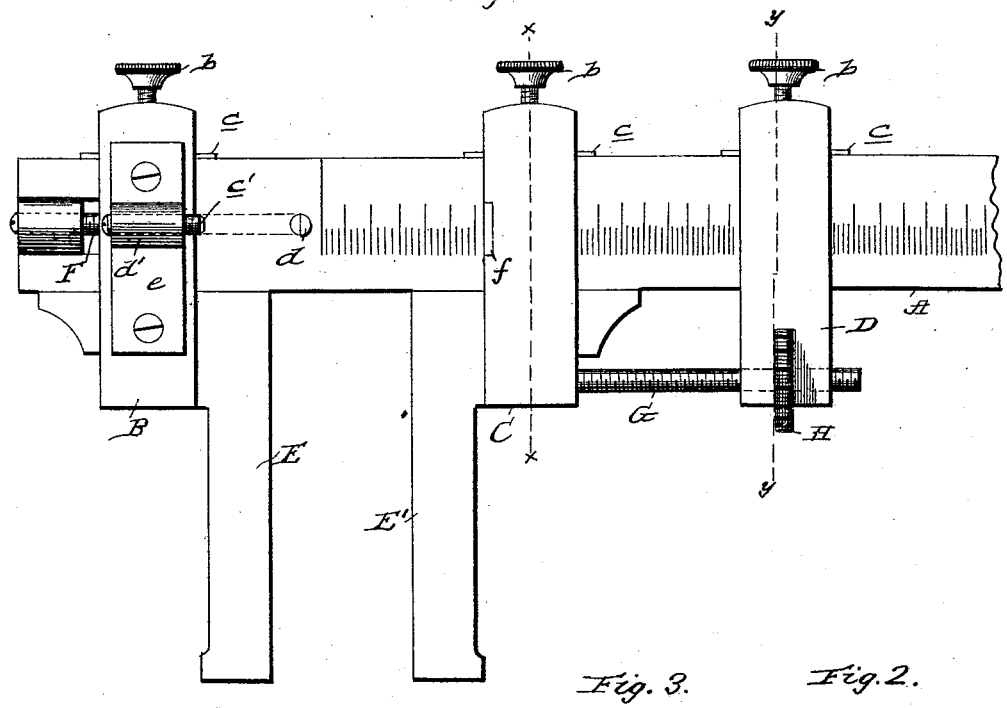
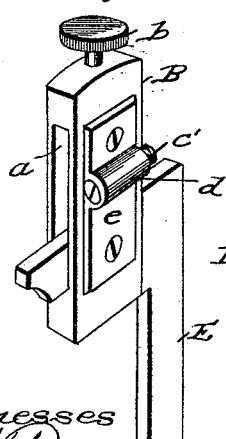
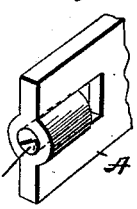
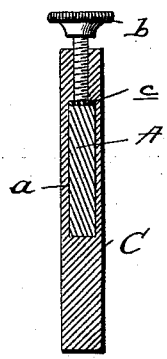
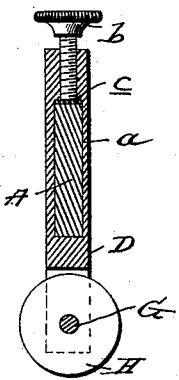
Witnesses
Inventor
Alfred Barker
By James J Sheehy
Attorney

UNITED STATES PATENT OFFICE.

ALFRED BARKER, OF RICHFIELD SPRINGS, NEW YORK.

BEAM-CALIPERS.

SPECIFICATION forming part of Letters Patent No. 496,679, dated May 2, 1893.

Application filed January 9, 1893. Serial No. 457,824. (No model.)

*To all whom it may concern:*

Be it known that I, ALFRED BARKER, a citizen of the United States, residing at Richfield Springs, in the county of Otsego and State of New York, have invented certain new and useful Improvements in Caliper-Squares; and I do declare the following to be a full, clear, and exact description of the invention, such as will enable others skilled in the art to which it appertains to make and use the same.

My invention has relation to improvements in caliper squares, and its novelty will be fully understood from the following description and claims when taken in connection with the annexed drawings in which—

Figure 1, is a side elevation of my improved instrument. Fig. 2, is a vertical transverse section taken in the plane indicated by the line $y, y$, of Fig. 1. Fig. 3, is a similar view on the line $x, x$, of Fig. 1. Fig. 4, is a detail perspective view of the post and jaw, through the medium of which, an outside measurement may be readily changed to an inside measurement, and vice-versa, and Fig. 5, is a detail perspective view of one end of the beam, illustrating the adjusting screw.

Referring by letter to said drawings: A, indicates the beam of my improved caliper square, and B, C, and D, indicate posts which are mounted and are adapted to be adjusted upon the beam as will be presently described. Each of these posts B, C, D, which are provided with slots $a$, to receive the beam, carries a binding screw $b$, and these screws $b$, bear upon springs $c$, which in turn bear upon the beam so as to increase the frictional contact between the posts and beam so that said posts will be held against casual movement when the screws are loosened.

The posts B, and C, are each provided with jaws E, E', which rest at right angles to the beam as shown, and the post B, is also provided with a screw or projection $c'$, which is designed to engage a lug $d$, on the beam for a purpose presently described. This screw or projection $c'$, of the post B, takes through a threaded rib or barrel $d'$, formed in a plate $e$, which is connected to the post by screws or the like, as shown. By this construction it will be readily perceived that when it is desired to adjust the screw $c'$, for a purpose presently described, one of the screws connecting the plate $e$, and the post must be loosened, as said plate serves effectually as a clamp to prevent a casual adjustment or movement of the screw $c'$.

F, indicates a screw which is of a greater diameter than the width of the beam A. This screw F, which takes through a threaded bore at one end of the beam as shown, serves as an abutment for the post B, and also serves to limit the adjustment of said post, so that the jaws E, E', will come together when the index $f$, on the latter jaw registers zero on the beam.

The adjustment of the post B, between the screw F, and the lug $d$, is limited to a distance equal to the combined width of the jaws E, E', by reason of which it will be seen that the interior measurement of an object may be made by fixing the post B, against the lug $d$, and adjusting and fixing the jaw E', with respect to the jaw E, after which the instrument may be removed and the distance between the outer edges of the jaws E, E', can be transferred and brought between the inner edges of said jaws by simply adjusting the post B, over against the screw F. This construction is especially advantageous in the fitting of pulleys on shafts and similar work, inasmuch as the exact diameter of the bore of the pulleys may be readily ascertained and compared with that of the shaft, and thus a great deal of labor and time may be saved.

Connected to the adjustable post C, and extending through the post D, is a threaded bar G, with which engages an interiorly threaded wheel H, carried by said post D. This wheel H, which is designed to be rotated to impart a delicate adjustment to the post C, is provided upon its periphery with twenty (more or less) equi-distant graduations, and the screw G, is provided with fifty (more or less) threads to the inch, whereby it will be seen that an adjustment or movement of the wheel H, equal to the distance between two graduations will move the jaw E', one thousandth of an inch. By this means, an extremely slight and delicate movement of the jaw E', may be effected and a most accurate measurement made, which is an important desideratum.

By the provision of the adjustable screw $c$, in conjunction with the lug $d$, it will be readily perceived that the distance traversed by the post B, may be readily regulated so as to make up for any frictional wear that might occur in the use of the instrument.

It will be seen from the foregoing description taken in connection with the drawings, that I have provided a simple, durable, and inexpensive instrument that may be employed to advantage for making inside and outside measurements of the most delicate character, and one that may also be employed for various other purposes.

I am aware that many changes or modifications may be made in the construction of my improved instrument without departing from the gist or spirit of my invention, and I therefore do not desire to be confined to the precise construction and relative arrangement of parts herein disclosed.

Having described my invention, what I claim is—

1. In a caliper square, the combination of a beam, a jaw E', adjustable with respect to said beam, and a jaw E, having a limited adjustment the extent of which is equal to the combined width of the jaws E, E', substantially as and for the purposes specified.

2. In a caliper square, the combination of a beam, an adjustable post C, mounted on the beam and carrying the jaw E', and the post B, also mounted on the beam and carrying the jaw E, the said post B, having a limited adjustment on the beam the extent of which is equal to the combined width of the jaws E, E', substantially as and for the purpose set forth.

3. In a caliper square, the combination of a beam having a lug or stop $d$ at an intermediate point in its length and also having an abutment at a distance from the lug or stop, a post mounted and adapted to be adjusted upon the beam and carrying a jaw, and a post mounted and adapted to be adjusted on the beam between the abutment and the lug or stop $d$ thereof and also carrying a jaw, the adjustment of the latter post being limited by the stop $d$, and the abutment to a distance equal to the combined width of the jaws, substantially as specified.

4. In a caliper square the combination of a beam, an adjustable post C, mounted on the beam and carrying a jaw, the post B, mounted on the beam and carrying a jaw, the abutment F, and the stop $d$, carried by the beam and adapted to limit the adjustment of the post B, to a distance corresponding in length to the combined width of the jaws, the plate $e$, connected to the post B, and the screw taking through a threaded bore in said plate, substantially as specified.

5. In a caliper square, the combination of a beam, a post C, mounted on said beam, and carrying a jaw E', a post B, mounted on the beam and carrying a jaw E, and having a limited adjustment the extent of which is equal to the combined width of the jaws E, E', a post D, also mounted on the beam, a screw connected to the post C, and extending through the post D, and an interiorly threaded wheel carried by the post D, and engaging the threaded screw; the said wheel being provided with peripheral graduations, substantially as and for the purpose set forth.

In testimony whereof I affix my signature in presence of two witnesses.

ALFRED BARKER.

Witnesses:
JOHN H. KEHRER,
C. L. HOUSE.